(12) United States Patent
Sommer et al.

(10) Patent No.: US 6,511,101 B1
(45) Date of Patent: Jan. 28, 2003

(54) SNAP-ON CENTRAL SUPPORT TUBE FOR A FILTER ELEMENT

(75) Inventors: Bruno Sommer, Ludwigsburg (DE); Helmut Luka, Kornwestheim (DE)

(73) Assignee: Filterwerk Mann & Hummel GmbH, Ludwigsburgh (DE)

( * ) Notice: Subject to any disclaimer, the term of this patent is extended or adjusted under 35 U.S.C. 154(b) by 0 days.

(21) Appl. No.: 09/147,942

(22) PCT Filed: Jul. 22, 1997

(86) PCT No.: PCT/EP97/03940
§ 371 (c)(1),
(2), (4) Date: Mar. 24, 1999

(87) PCT Pub. No.: WO98/05403
PCT Pub. Date: Feb. 12, 1998

(30) Foreign Application Priority Data

Aug. 2, 1996 (DE) .................................... 196 31 278

(51) Int. Cl.$^7$ .................................................. F16L 39/00
(52) U.S. Cl. ........................................ 285/319; 285/921
(58) Field of Search ................................. 285/319, 423, 285/921, 376, 65–72

(56) References Cited

U.S. PATENT DOCUMENTS

| 653,143 A | * | 7/1900 | Martin | 285/67 |
|---|---|---|---|---|
| 847,472 A | * | 3/1907 | Hafer | 285/67 |
| 1,661,674 A | * | 3/1928 | Osborn | 285/921 |
| 2,950,130 A | * | 8/1960 | Schneider | 285/67 |
| 3,193,311 A | * | 7/1965 | Gordan | 285/70 |
| 3,195,931 A | * | 7/1965 | Braunagel | 285/70 |
| 3,711,135 A | * | 1/1973 | Akesson | 285/70 X |
| 3,785,584 A | * | 1/1974 | Crellin | 285/921 |
| 4,105,562 A | * | 8/1978 | Kaplan | |
| 4,228,012 A | * | 10/1980 | Pall | 285/921 |
| 4,865,738 A | * | 9/1989 | Black et al. | |
| 5,078,430 A | * | 1/1992 | Onge | 285/423 |
| 5,466,020 A | * | 11/1995 | Page et al. | 285/376 |

* cited by examiner

Primary Examiner—Gary Estremsky
(74) Attorney, Agent, or Firm—Crowell & Moring LLP

(57) ABSTRACT

A support tube for a fluid filter, particularly a support tube made of synthetic resin material, which is made up of two substantially identical tube parts (3) each of which has at least one inlet opening (4), at least one outlet opening (5) and at least one radial sealing area (6) and/or axial sealing area (7), and at least one connecting region (8) which engages the other tube part to connect the tube parts and form an assembled support tube.

5 Claims, 2 Drawing Sheets

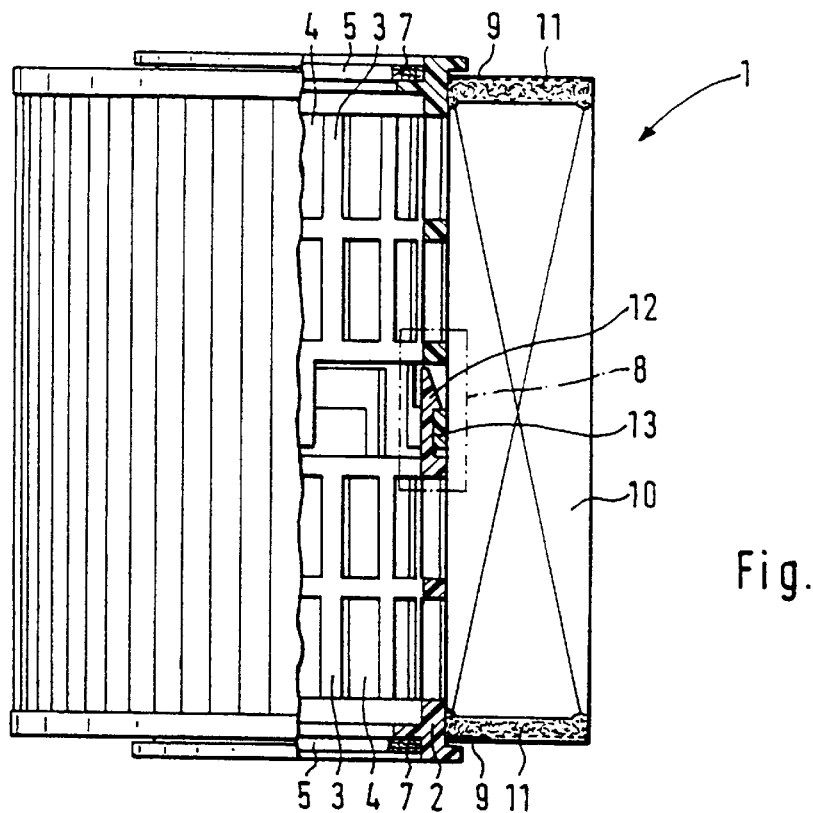
Fig. 1
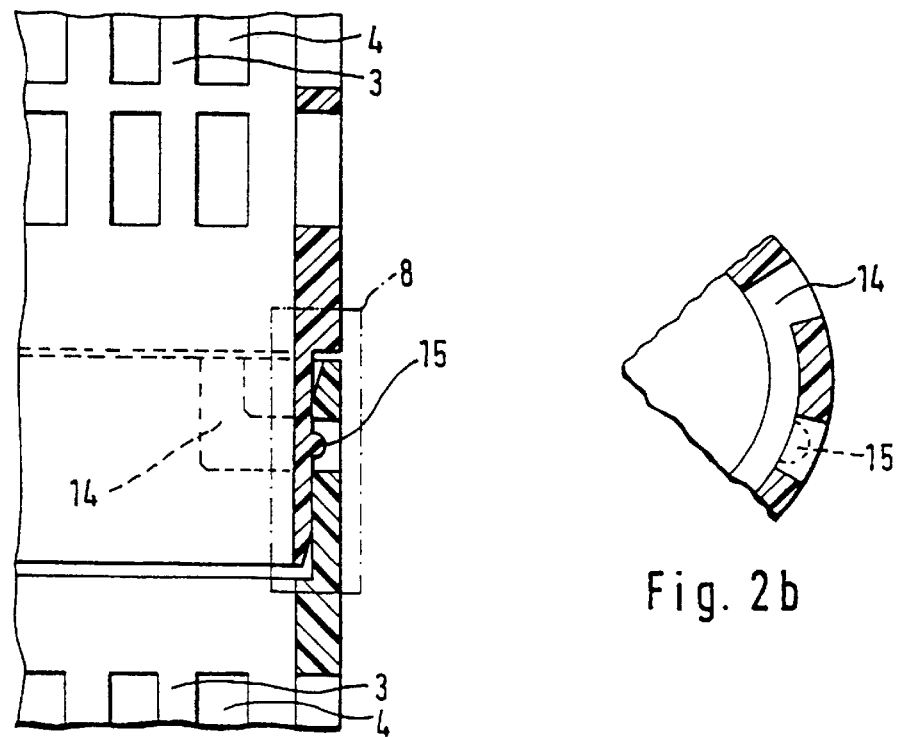
Fig. 2a
Fig. 2b

SNAP-ON CENTRAL SUPPORT TUBE FOR A FILTER ELEMENT

BACKGROUND OF THE INVENTION

This invention relates to a support tube for a felter element, and to a filter incorporating such a support tube.

Support tubes and filter elements of this kind are disclosed, for example, in German Offenlegungsschrift 37 23 807.

In such support tubes and filter elements it is a disadvantage that a plurality of different elements is necessary in order to make them, and consequently this calls for various tools and increases the cost of the finished product.

A one-piece support tube could be provided, which would require only one injection molding tool for its production. This, however, would lead to problems with regard to leakage.

SUMMARY OF THE INVENTION

It is therefore the object of the invention to provide a support tube and a filter element of the kind referred to above, which will eliminate the aforementioned disadvantages and produce a supporting tube and a filter element which will be easy to manufacture inexpensively and with good sealing qualities.

This object is achieved by the invention in that the supporting tube is composed especially of synthetic resin (plastic) and can be comprised of two substantially identical partial elements, each partial element having at least one inlet and outlet opening, as well as a radial and/or axial sealing area, and having at least one connecting area in communication with the other partial element. Providing sealing surfaces on the plastic partial elements and standardizing them reduces the number of elements needed, so that less costly products result.

An advantageous embodiment of the invention envisions constructing the radial sealing area substantially cylindrical. This cylindrical configuration provides the possibility of a uniform contact due to the consistent continuation of the supporting tube's geometry, of the filter element on the supporting tube, for example.

Another advantageous embodiment of the invention envisions that the radial sealing area is conically configured. This has the advantage that, due to the conical configuration, when the supporting tube is assembled with, for example, the paper filter cartridge, a centering and positive contact in the sealing area will occur.

In another advantageous embodiment of the invention, it is envisioned that the connecting areas of the two partial elements are configured as a snap fastener. In this case it proves especially advantageous that no additional assembly work is needed to join these partial elements together.

Another advantageous refinement of the invention envisions that the connecting areas of the two partial elements are configured as a detent connection. In this case it is especially advantageous that a secure connection of both elements is produced, so that the stability of the entire element is assured.

An advantageous refinement of the invention envisions that the connecting areas of the two partial elements are configured as a bayonet lock. As in the case of the snap fastener, no additional assembly work is needed with this bayonet lock. The bayonet lock assures, in case of disassembly, a controlled opening of the entire joint between the two partial elements.

An additional advantageous refinement of the invention envisions that the two partial elements are identical, so that they can be manufactured in a single tool, which results in cost advantages.

Furthermore the object is also achieved by utilizing in a filter element a support tube as described above. Especially advantageous is the use of easily and inexpensively manufactured support tube elements which desirably originate from a single tool, and which furthermore, after installation the filter element, simultaneously perform a sealing function in the areas where it is needed.

An embodiment of the invention and its advantageous refinements are described in further detail hereinafter with reference to the accompanying drawings, wherein:

BRIEF DESCRIPTION OF THE DRAWINGS

FIG. 1 shows a complete filter element in section,

FIG. 2a shows a partial sectional view of a bayonet turn-and-snap connection,

FIG. 2b shows a detail illustration from FIG. 2a

DETAILED DESCRIPTION OF PREFERRED EMBODIMENTS

Figure 3:
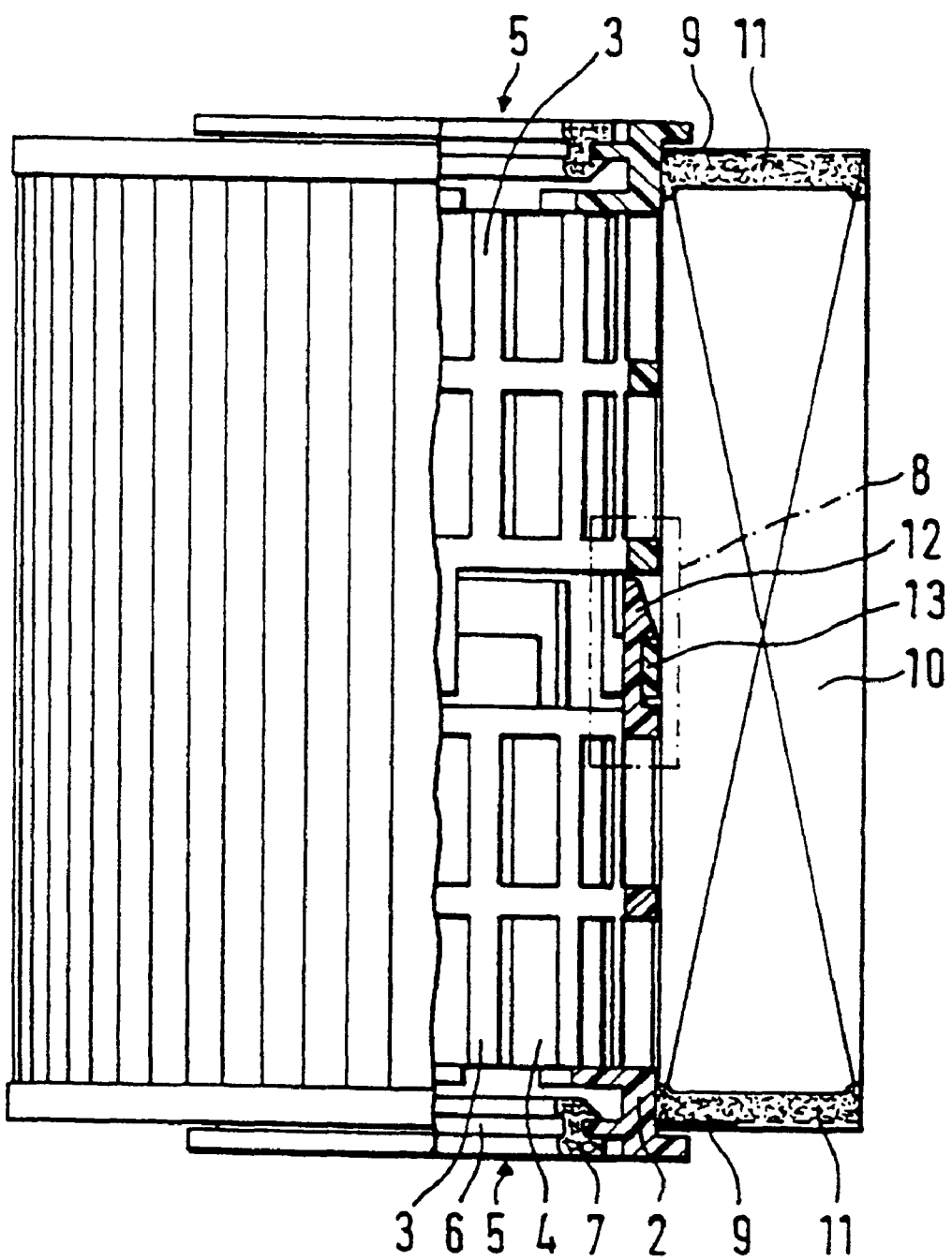
FIG. 3 shows a complete filter element made of identical partial elements, in section.

The filter element which is depicted in FIG. 1 is comprised of a supporting tube 2 and a paper element 10. The supporting tube 2 is composed of two partial elements 3. Each of these partial elements has radial inlet openings 4 distributed over its outer surface, as well as an outlet opening 5, so that the actual filtration process takes place from the outside in. In the vicinity of the outlet opening 5 there is an axial sealing area 7 by means of which the support tube and the filter element separate the clean side from the unfiltered side.

As an alternative to this it would be conceivable for the filtration process also to be operated from the inside out, in which case the inlet opening would be the outlet opening and vice versa. The paper element 10, which has a paper element end closure 11, has in this embodiment, which can be disassembled, a gasket 9 placed in the end of the paper element. Both elements, namely the paper element end closure 11 and the gasket 9, have a sealing function, in order to separate the clean side from the unfiltered side. The two partial elements 3 are inserted in such a way that the paper element 10 is not compressed. In this way a reliable radial seal between supporting tube 2 and paper element 10 is formed in radial seal areas between the partial elements 3 which form the supporting tube 2. At the ends of the partial elements 3 is an axial sealing area 7 which can be constructed in the form of an axial plate gasket. In the connection area 8 of the two partial elements 3, one partial element has, for example, four snap fastener tongues 12; the other partial element 3 has the mating catch projections 13. When the entire filter element is assembled, the snap fastener tongues 12 snap into the respective catch projections 13 of the other partial element.

In one variant, each of the partial elements 3 has, for example, two snap tongues each, and two catch projections, as shown in FIG. 1, so that the partial elements are absolutely identical and can be manufactured by means of a single tool.

In an embodiment as shown in FIG. 2a, each partial element 3, which has inlet openings 4 distributed over its outer surface, has at least one guide slot 14 of a bayonet lock, as well as at least one guide pin of a bayonet lock. The guide slot 14 of the one partial element 3 engages with the guide pin 15 of the other partial element 3, such that a releasable turn-and-snap lock is created. FIG. 2b shows in detail the bayonet lock with guide groove 14 and guide pin 15 from FIG. 2a.

Each of the partial elements 3 has, for example, two snap fastener tongues 12 and two catch projections 13, as shown in FIG. 3, so that the partial elements are absolutely identical and can be produced with a single tool. The filter element shown in FIG. 3 is comprised of a support tube 2 and a paper element 10. The support tube 2 is composed of two partial elements 3. Each of these partial elements has radial inlet openings 4 distributed over its outer surface and it has also an outlet opening 5, so that the actual filtration is performed from the outside in. In the vicinity of the outlet opening 5 is a seal area 6, 7, by means of which the supporting tube and filter element separate the clean side from the unfiltered side. As an alternative it would be conceivable for the filtration also to be performed from the inside out, in which case the inlet opening would become the outlet opening and vice versa. The paper element 10, which has a paper element end closure 11, has in this embodiment, which is capable of being disassembled, a gasket 9 placed in the paper element end closure. Both elements, namely paper element end closure 11 and gasket 9, have a sealing function in order to separate the clean side from the unfiltered side. The two partial elements 3 are inserted such that the paper element 10 does not become compressed. In this manner a reliable radial seal between supporting tube 2 and paper element 10 is formed in radial sealing areas between the partial elements 3 which form the supporting tube 2. At the ends of the partial elements 3 there is both an axial seal area 7 and also a radial seal area 6 which is constructed in the form of a lipped seal.

What is claimed is:

1. A fluid filter comprising: an annular filter element disposed on a central support tube, said support tube being assembled from two identical tube parts, each tube part having at least one inlet opening and at least one outlet opening; each tube part further comprising at least one radial or axial sealing end region and at least one connecting region, the connecting end region including at least two snap-on tabs and at least two locking projections, the snap-on tabs of one of the tube parts being configured to snap into the corresponding locking projections of the other tube part to produce a releasable connection between the tube parts when the tube parts are pushed against each other in the axial direction.

2. A support tube according to claim 1, wherein said tube parts are molded from synthetic resin material.

3. A support tube according to claim 1, wherein said support tube comprises a redial sealing end region which is substantially cylindrically shaped.

4. A support tube according to claim 1, wherein said support tube comprises a redial sealing end region which is substantially conically shaped.

5. A support tube according to claim 1, wherein the at least one inlet opening of each tube part is arranged radially on the respective tube part.

\* \* \* \* \*